United States Patent [19]

Pauls et al.

[11] 4,144,983
[45] Mar. 20, 1979

[54] CHILD-RESISTANT CLOSURE

[75] Inventors: James D. Pauls; Roy Hammett, both of Miami, Fla.

[73] Assignee: Lewis, Pauls and Associates, Ltd., Miami, Fla.

[21] Appl. No.: 861,513

[22] Filed: Dec. 16, 1977

[51] Int. Cl.² ................ B65D 55/02; B65D 85/56; A61J 1/00
[52] U.S. Cl. ................................ 215/216; 215/1 C; 215/31
[58] Field of Search ............... 215/216, 1 C, 218, 209, 215/221, 31

[56] References Cited
U.S. PATENT DOCUMENTS

| | | | |
|---|---|---|---|
| 3,902,620 | 9/1975 | McIntosh | 215/209 |
| 4,036,385 | 7/1977 | Morris | 215/216 X |
| 4,069,942 | 1/1978 | Marshall et al. | 215/216 X |

*Primary Examiner*—George T. Hall
*Attorney, Agent, or Firm*—Dennis H. Lambert

[57] ABSTRACT

A child-resistant closure for a container having a screw threaded neck, includes a cap having an end wall and a depending, cylindrical skirt with screw threads therein for mating cooperation with the screw threads on the container to releasably secure the cap to the container. Interengaging, selectively releasable detent members are formed on the cap and container for resisting removal of the cap by a child, but enabling an adult to remove the cap. The detent members include a plurality of detents on the cap and a cooperating detent on the container, wherein the detents have first cooperating, interengagable surfaces to enable the detents to move past one another in a cap tightning direction, and second cooperating, interengagable surfaces to prevent movement of the detents past one another in a cap loosening direction. The detents on the cap have different lengths in a direction axially of the cap, with the leading detent being longest and the trailing detent being shortest, whereby any of the detents will engage the detent on the container with substantially equal area within a predetermined range of rotational positions of the cap on the container. The detent on the container is carried by a movable, flexible release member which flexes to permit the detents to move past one another in a cap tightning direction, and the release member has an at rest position with the detents interengaged to prevent removal of the cap. The release member is constructed to be easily manually flexed in a direction to disengage the detents and thus enable the cap to be removed.

27 Claims, 37 Drawing Figures

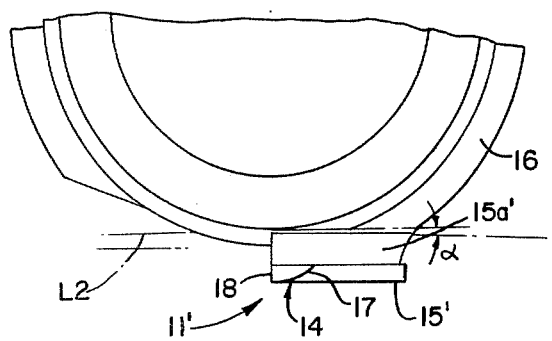
FIG. 11.
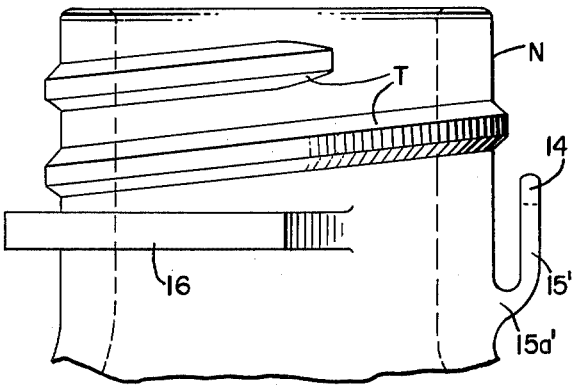
FIG. 13.
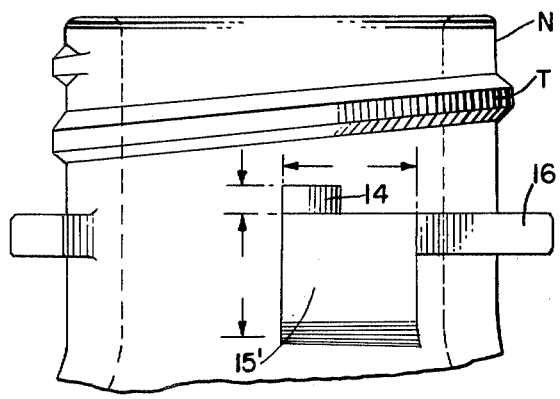
FIG. 12.
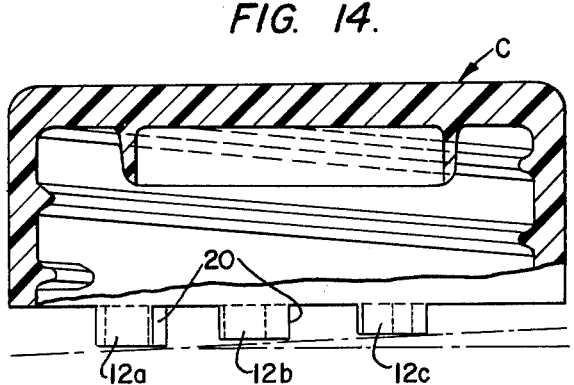
FIG. 14.
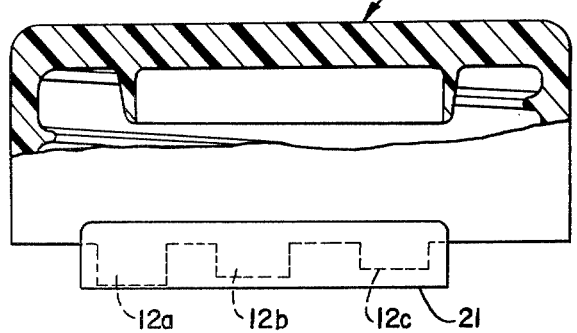
FIG. 17.
FIG. 15.
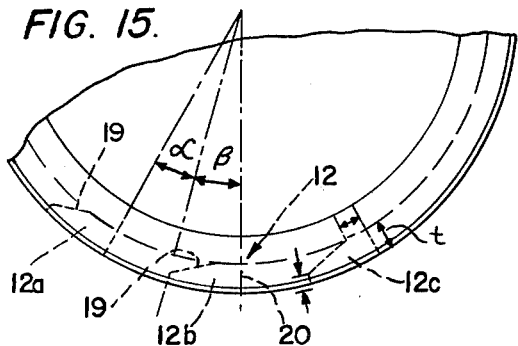
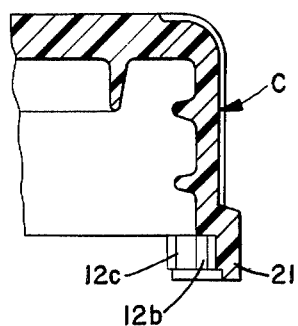
FIG. 18.
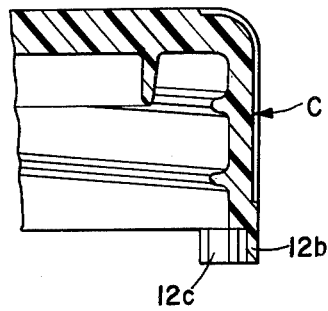
FIG. 16.

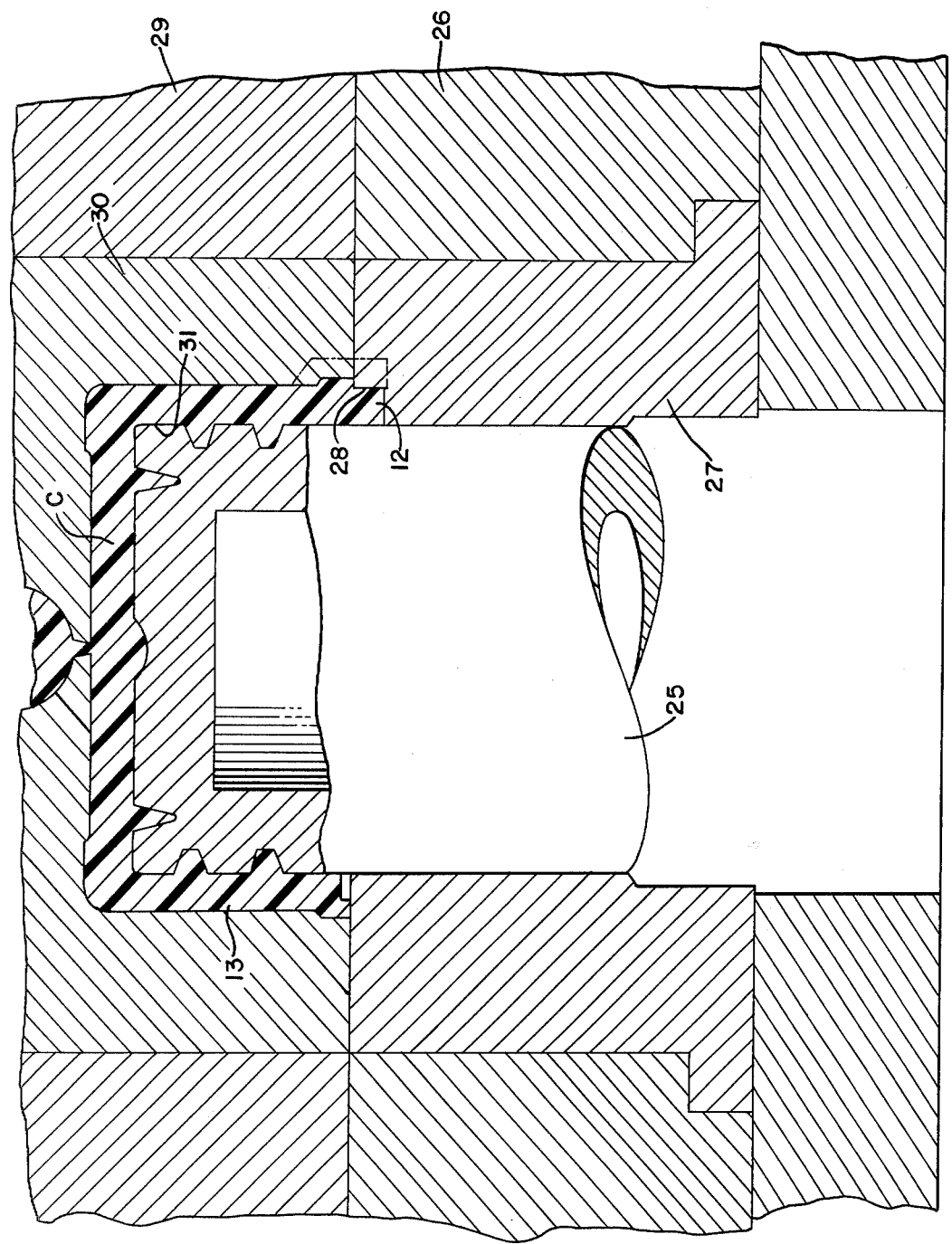

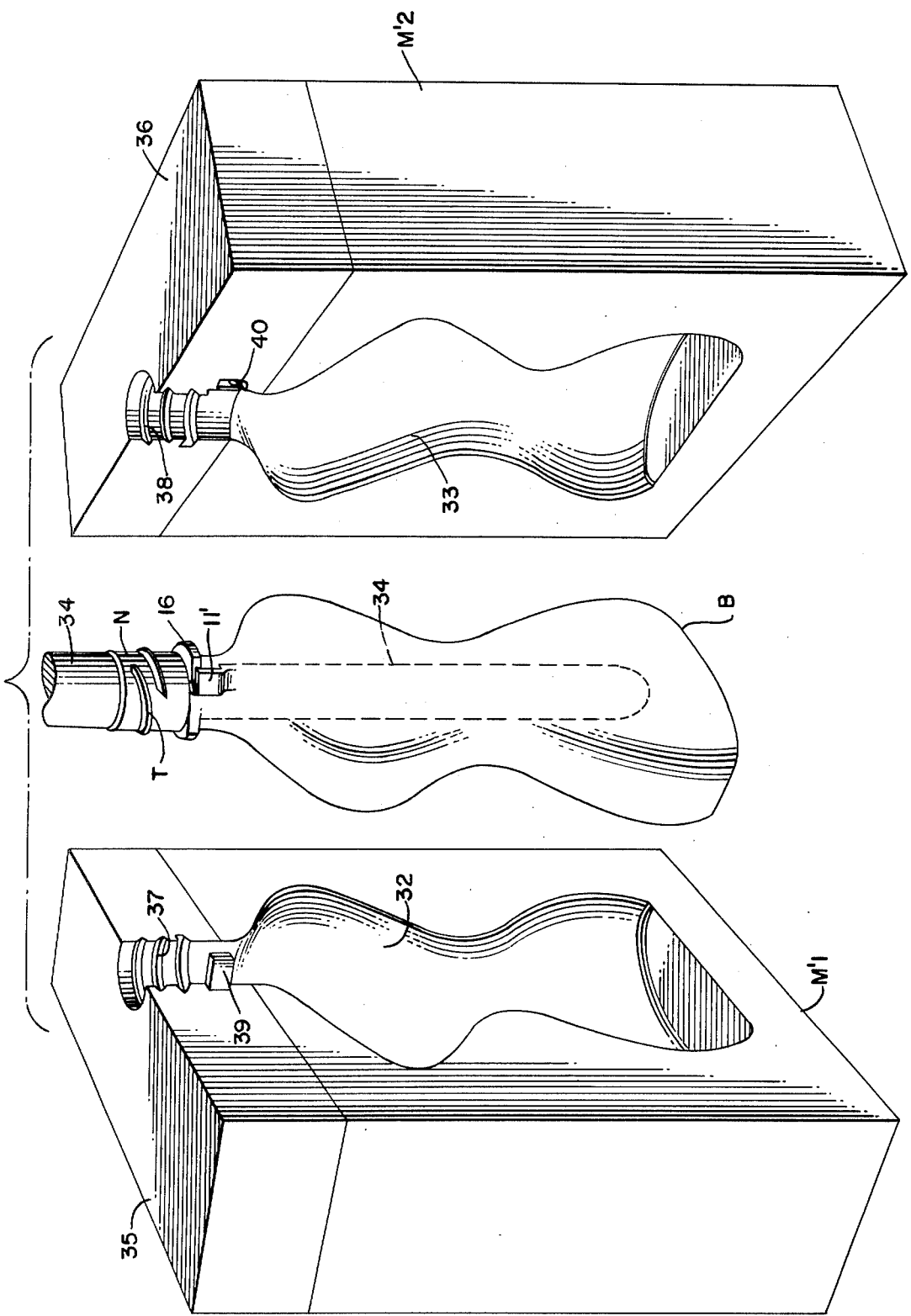

CHILD-RESISTANT CLOSURE

BACKGROUND OF THE INVENTION

This invention relates generally to closures and more particularly, to a child-resistant closure for use on a container intended to hold a product generally regarded as hazardous or dangerous to children. For example, such materials as oven and drain cleaners, harsh chemicals, dangerous prescription and standard household drugs are considered in this category.

Due to the number of injuries and deaths reported each year from ingestion and accidental contact with such dangerous products, particularly by children, containers and closures for such products have come under increasing scrutiny by Federal and State governments as well as by consumer groups. In fact, an increasing number of products are required by law and consumers groups to be in child-resistant containers, constructed such that children under a certain age limit are unable to open the containers within a prescribed period of time.

Additionally, from the manufacturers or marketers standpoint such further criteria as design, cost, simplicity of operation, production line complexities and the like, must be considered so that the most effective and economic child-resistant closure can be utilized.

Many efforts have been made in the prior art to devise a child-resistant closure which meets the above criteria, and various degrees of success have been achieved. Examples of some prior art devices are disclosed in U.S. Pat. Nos. 3,902,620, 3,989,152, 4,002,259, 4,036,385 and 4,053,077. However, all of these devices require rather substantial mold changes in order to make them and as a result the cost thereof is relatively higher in comparison with a standard cap or closure. For example, it has been estimated by the industry that the cost of child-resistant caps varies from one and one-half to two and one-half times the cost of an existing primary cap. Additionally, the particular structures and functions of these devices are different from applicant's invention.

The present invention, on the other hand, appears to meet all of the criteria listed above in that it is of simple construction, is simple and easy to operate, costs about the same or only slightly more than a standard cap and requires only minor changes to production line equipment. For example, in order to make the child-resistant closure of the present invention, only minor changes are required to the ejector sleeve in the closure mold and to the neck ring in the injection or extrusion blow mold tooling. In fact, the neck ring and ejector sleeve may be readily interchanged for conversion of the mold equipment from a standard cap or closure to the child-resistant closure of the invention. It is estimated that the cost to convert a thirty-two cavity closure mold from a standard cap to the child-resistant closure of the invention will be only about three thousand five hundred dollars, as compared with fifty thousand to seventy-five thousand dollars required to make a new mold to produce most of the prior art devices.

OBJECTS OF THE INVENTION

Therefore, it is an object of this invention to provide a child-resistant closure having a design compatible with market requirements and being economical and simple in construction and easy to use.

Another object of the invention is to provide a child-resistant closure which can be made with only slight changes to the ejector sleeve and neck ring of existing mold tooling.

A still further object of the invention is to provide a linerless child-resistant closure of one-piece construction which has a plurality of detents thereon, adapted to cooperate with a complementary detent on a flexible retaining member and wherein the detents on the closure are configured and sized such that each one of them is capable of engaging the detent on the release member with substantially the same area and force of engagement within a predetermined range of rotational postions of the closure on the container.

Another object of the invention is to provide a child-resistant closure construction wherein the release member carries a detent in a position to engage at least one detent on a closure for preventing movement of the closure in a loosening direction and wherein the release element or member flexes about a defined area to easily release the closure for removal from the container and wherein flexure of the release element over a defined area prevents areas of high stress concentration, thus prolonging the life of the release element or member.

A still further object of the invention is to provide a child-resistant closure wherein the closure includes an end wall and a cylindrical skirt, said skirt having a plurality of detents or teeth thereon for cooperation with a retaining element on the container to arrest movement of the closure in an opening direction and thus prevent removal of the closure from the container unless the retaining element is flexed, and wherein the teeth on the closure are varied in size with the free ends of the teeth lying along a line parallel to a tangent of the helix angle of the closure threads, whereby the teeth will each engage the retaining element with a full contact within a predetermined range of rotational positions of the closure, and further, wherein at least three teeth are provided for accomodating oversize and undersize tolerances in the manufacture of the closure and/or oversize and undersize tolerances in the manufacture of the containers.

BRIEF DESCRIPTION OF THE DRAWINGS

FIG. 11 is a fragmentary, plan view similar to FIG. 8 of a modified form of the invention shown in FIG. 8 wherein the hinge area of the retaining element is in a direction transverse to the axis of the container rather than parallel thereto as in FIG. 8.

FIG. 12 is a front view in elevation similar to FIG. 9 of the form of the invention shown in FIG. 11.

FIG. 13 is a side view in elevation similar to FIG. 10 of the form of the invention shown in FIGS. 11 and 12.

FIG. 14 is an enlarged view shown partially in section of the closure and detents carried thereby for use with the retaining element and detent in accordance with the two forms of the invention illustrated in FIGS. 1 through 10, and 11 through 13, respectively.

FIG. 15 is a fragmentary, plan view of the closure of FIG. 14 showing the arrangement of detents thereon.

FIG. 16 is an enlarged fragmentary view in section, of the closure and detents of FIGS. 14 and 15.

FIG. 17 is a view in elevation similar to FIG. 14 of a modified closure and detent arrangement wherein a reinforcing skirt is molded on the closure adjacent the detents to provide greater strength thereto.

FIG. 18 is a view similar to FIG. 16 of the modified closure of FIG. 17.

FIG. 36 is an enlarged fragmentary view in section of a portion of the mold apparatus of FIG. 35 showing the parts in contacting relation for injecting plastic into the mold cavity.

FIG. 37 is an enlarged fragmentary, diagramatic, perspective view of a portion of the injection blow mold equipment for making the container.

DETAILED DESCRIPTION OF THE INVENTION

Figure 1:
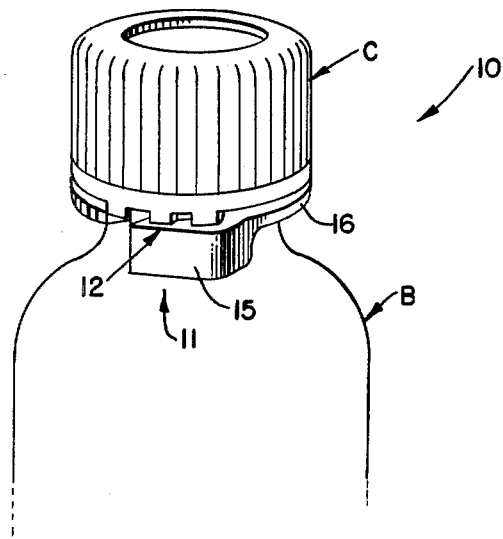
FIG. 1 is a perspective view of a portion of a container having a preferred form of closure according to the invention secured thereon.
Figure 2:
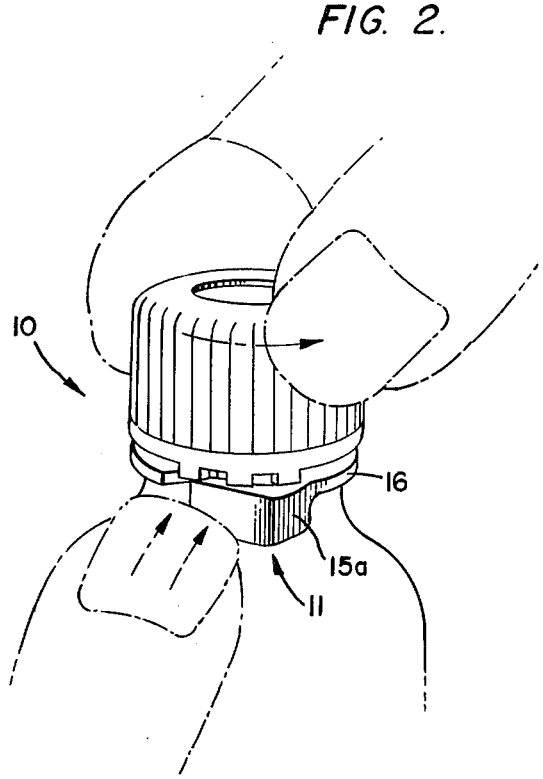
FIG. 2 is a view similar to FIG. 1 showing the manner in which the retaining element is flexed inwardly to permit removal of the closure.
Figure 3:
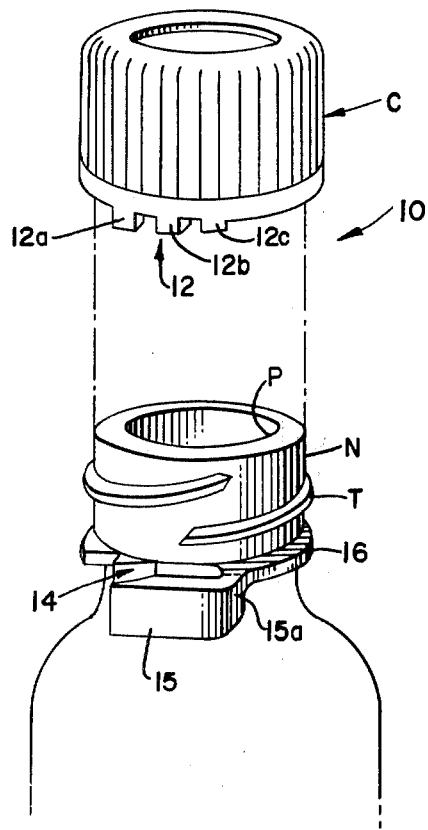
FIG. 3 is an exploded perspective view showing the closure of the invention removed from the container.
Figure 4:
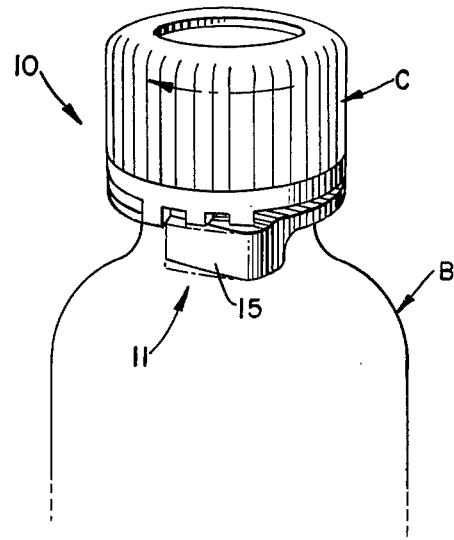
FIG. 4 is a perspective view similar to FIG. 1 showing the closure being applied to the container and illustrating the manner in which the teeth on the closure flex the retaining element inwardly while the closure is being applied to the container.
Figure 5:
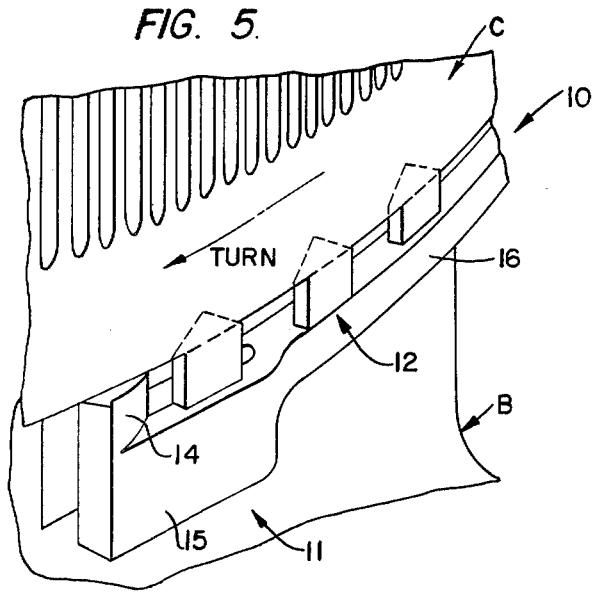
FIG. 5 is a greatly enlarged, fragmentary, perspective view of a portion of the closure of FIG. 1 and showing the manner in which the teeth on the closure move relative to the retaining element and detent carried by the container.
Figure 6:
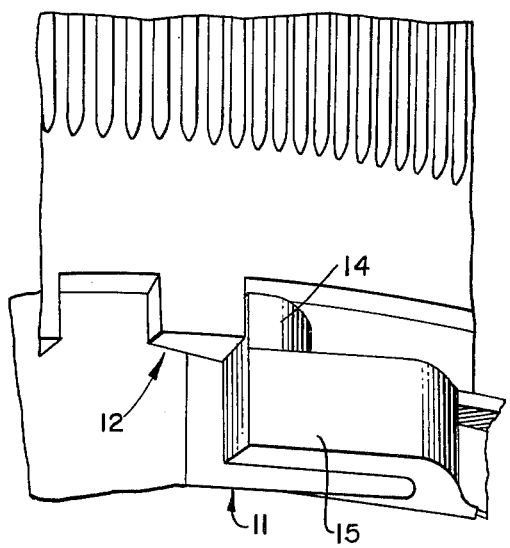
FIG. 6 is a greatly enlarged, fragmentary, perspective view of the closure and retaining element of FIG. 5 looking upwardly thereat and showing the detents on the closure engaged with the detent on the retaining element to prevent removal of the closure from the container.
Figure 7:
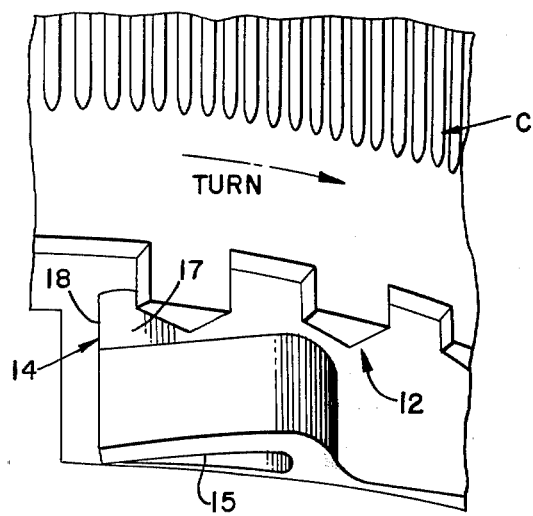
FIG. 7 is a view similar to FIG. 6 showing the retaining element and its detent flexed inwardly, thus permitting movement of the detents on the closure therepast in a closure loosening direction.
Figure 8:
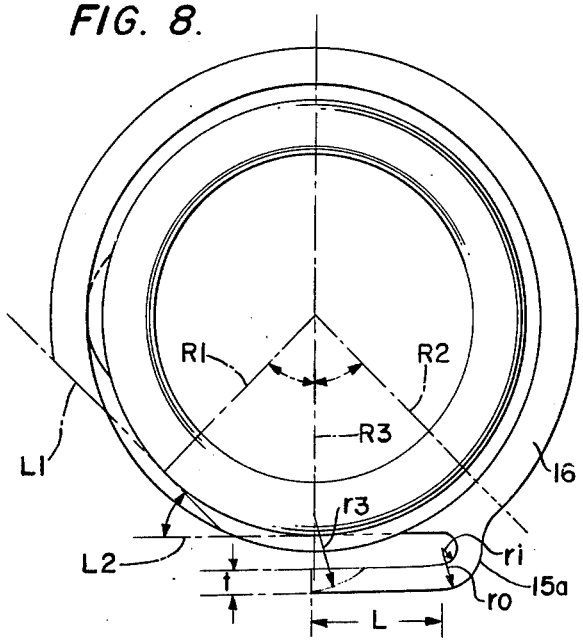
FIG. 8 is a plan view of the container release element and detent of FIGS. 1 through 7.
Figure 10:
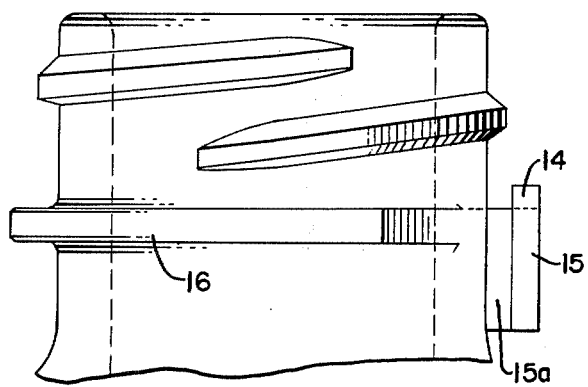
FIG. 10 is a side view in elevation of the container neck, release element and detent of FIG. 9.
Figure 9:
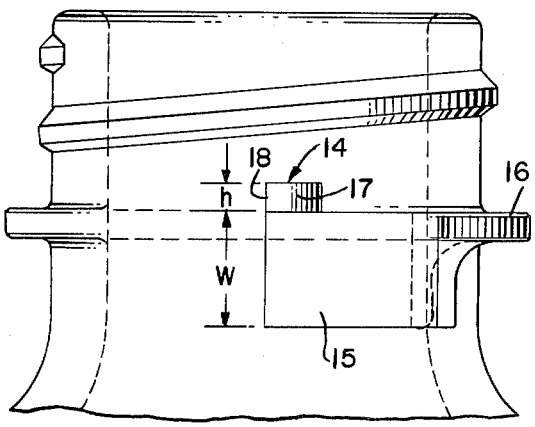
FIG. 9 is a front view in elevation of the container neck and release element and its detent of FIG. 8.
Figure 19:
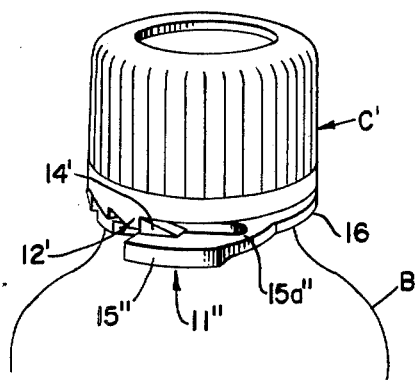
FIG. 19 is a perspective view similar to FIG. 1 of a modification of the invention wherein the retaining element is flexed in a direction generally parallel to the axis of the container to release the detents.
Figure 20:
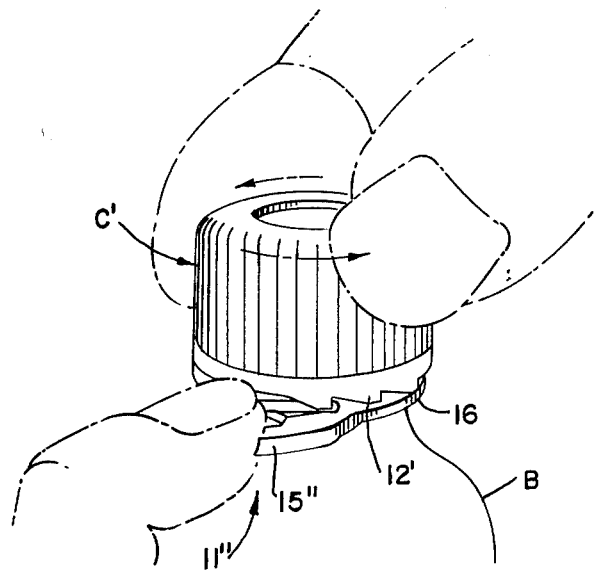
FIG. 20 is a view similar to FIG. 2 showing the manner in which the retaining element is flexed to release the closure.
Figure 21:
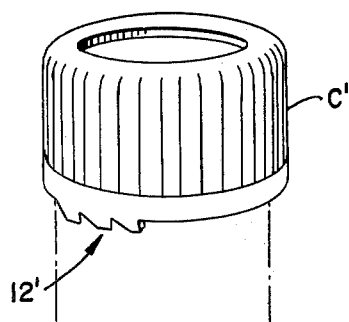
FIG. 21 is a view similar to FIG. 3 showing the closure removed from the container according to the modification of the invention in FIGS. 19 and 20.
Figure 22:
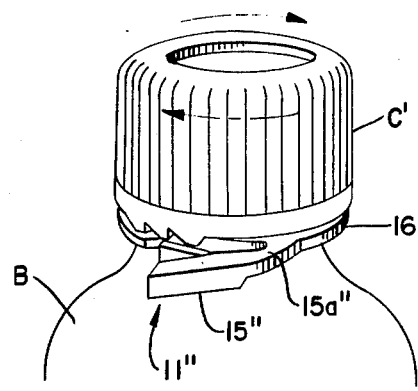
FIG. 22 is a view similar to FIG. 4 showing the closure being applied to the container and illustrating the manner in which the retaining element is flexed downwardly.
Figure 23:
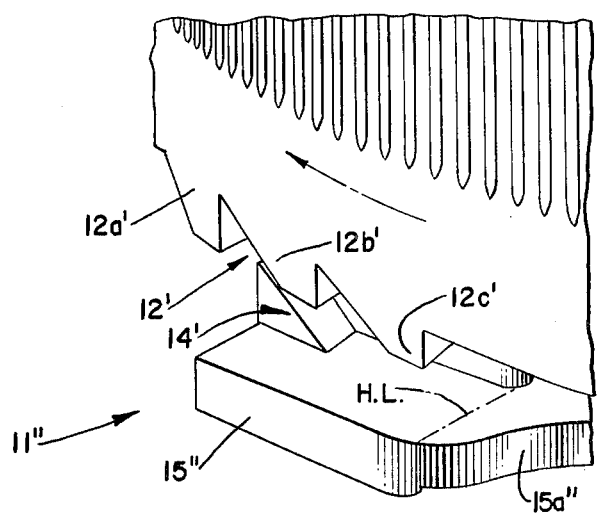
FIG. 23 is a greatly enlarged, fragmentary, perspective view of the invention shown in FIGS. 19 through 22 and illustrating in greater detail the manner in which the teeth or detents on the closure engage the detent on the retaining element of the container.
Figure 24:
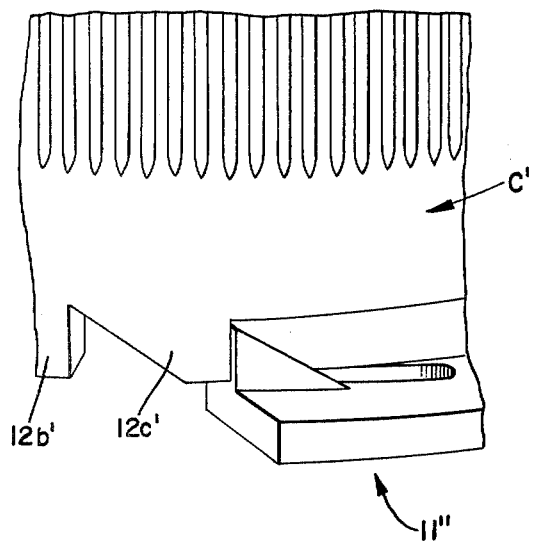
FIG. 24 is an enlarged fragmentary view in perspective showing the manner in which the detent on the retaining element engages a detent on the closure to prevent opening movement of the closure.
Figure 25:
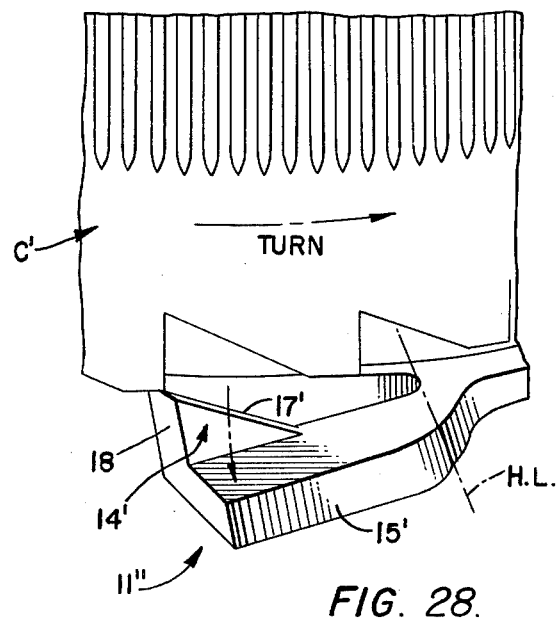
FIG. 25 is a view similar to FIG. 24 showing the manner in which the retaining element is flexed downwardly to release the detents on the closure to permit removal of the closure.
Figure 26:
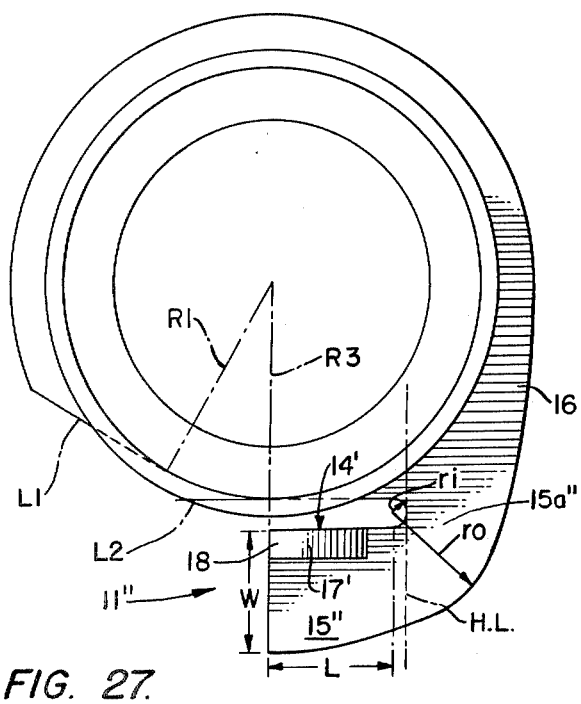
FIG. 26 is a plan view of the modified container and retaining element of FIGS. 19 through 25.
Figure 27:
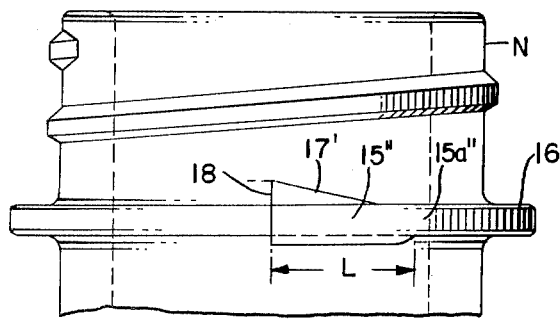
FIG. 27 is a front view in elevation of the modification of the invention shown in FIG. 26.
Figure 28:
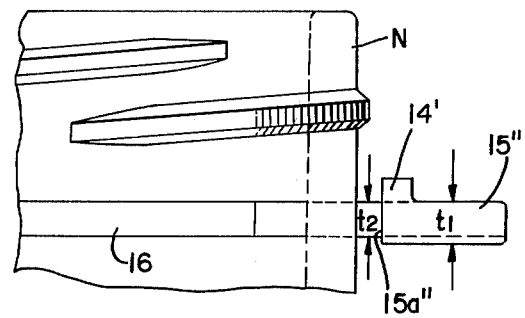
FIG. 28 is an enlarged, fragmentary, side view in elevation of the modification of the invention shown in FIG. 26.
Figure 29:
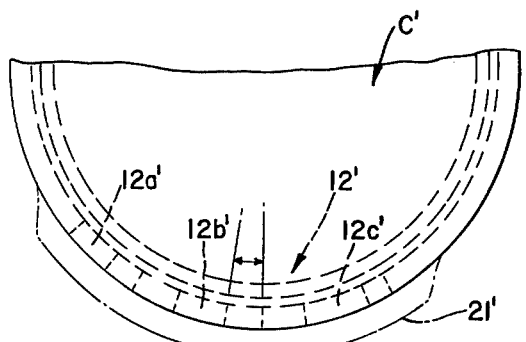
FIG. 29 is a fragmentary, plan view of the closure used with the form of retaining element and detent in FIGS. 19 through 28.
Figure 30:
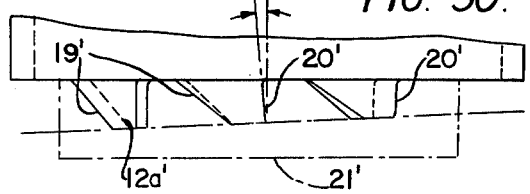
FIG. 30 is a fragmentary view in elevation of the closure and detents of FIG. 29.

In the drawings, wherein like reference numerals indicate like parts thoughout the several views, a first form of the invention is indicated generally at 10 in FIGS. 1 through 10 and comprises a container or bottle B on which a child-resistant closure or cap C is adapted to be secured.

A first form of the unique detent or latching means according to the invention is indicated generally at 11, and comprises a plurality of downwardly projecting teeth or detents 12 on the bottom edge of skirt 13 of closure C and a cooperating detent 14 carried by a release element 15 formed on the container or bottle B. Both the latching means 11 and the teeth or detents 12 are unique in that they cooperate in a manner to achieve a result not heretofore obtained.

Referring specifically to FIGS. 5 through 10 and FIGS. 14 through 18, details of construction of the preferred form of the invention can be seen.

The container or bottle B has a reduced diameter upstanding neck N thereon with a central bore or passage P therethrough and threads T formed on the exterior surface thereof. The container may be injection or extrusion blow molded and the threads T may be any suitable thread design. Additionally, a tooth ring 16 is preferably formed on the neck N, and extends circumferentially therearound. As seen best in FIG. 8, the tooth ring is interrupted along an area extending from line L1 drawn perpendicular to a radius R1, to a point defined by radius R2, displaced 90° from radius R1. A flat surface is molded in the exterior surface of the neck N, along line L2, extending perpendicular to a radius R3, disposed midway between radii R1 and R2, and the release element 15 is integrally molded with the container neck in the sector defined between radii R2 and R3. The release element 15 in effect constitutes a continuation of the tooth ring 16 in a clockwise direction into the sector between radii R2 and R3, and the upper edge surface of the release element is coplanar with the upper surface of tooth ring 16. The release element 15 is generally rectangular in shape and has a width W and length L, wherein the width is preferably slightly less than the length, although the dimensions may be the same or different, as desired. The release element is spaced outwardly from the flat surface defined by line L2 and is generally parallel thereto, although it tapers outwardly slightly from the fixed end to the free end thereof. The release element 15 has a substantially uniform thickness t throughout its length, and the thickness of the radiused or curved portion 15a joining the release element to the container is approximately the same as the thickness of the main body portion 15 of the release element. Moreover, the free end of the release element is spaced from the flat surface defined by line L2 a distance approximately the same as the thickness thereof, whereby the release element may be flexed inwardly to obtain clearance between the detent 14 carried thereby and the detents 12 carried by the cap or closure. Thus, the inside radius ri is slightly less than half the distance from the flat surface defined by line L2 to the inner confronting surface of the free end of release element 15 for manufacturing purposes and the outer radius ro is selected such that the thickness of the connecting portion 15a is substantially the same as the main body portion 15.

The detent 14 has a vertical height or extent h, approximately the same as the thickness t of the release element 15, and the outer surface 17 thereof is curved along a radius r3, selected such that contact thereof with one of the teeth 12 on the cap as the cap is threaded onto the container occurs with minimum friction and resistance, whereby the cap is easily placed on the container.

With the above described construction the release element 15 defines a flexible, spring-like element which flexes substantially throughout its length, including the connecting portion 15a, to thereby avoid concentrations of stress in any particular portion of the release element. Moreover, the release element is very easily manipulated, both to place a cap on the container and to release a cap for removal from the container. The placement and configuration of the release element relative to the container neck is such that the release element does not project outwardly a substantial distance whereby it might interfere with normal handling and manipulation of the container and yet it is disposed in the path of movement of the teeth on the closure cap when the closure cap is turned onto the container. Still further, the end or blocking surface 18 of detent 14 is disposed in a plane parallel to a radius of the container neck extended outwardly through the surface 18, whereby the surface 18 is disposed perpendicular to the path of movement of the detents 12 during opening movement of the closure C, and thus maximum blocking effectiveness is obtained, with least likelihood of deflection of release element 15 by application of force to the closure in an opening direction. In other words, the force exerted on the release element by a detent 12 on the closure caused by opening movement imparted to the closure is directed along the longitudinal axis of the release element 15 rather than at an angle thereto.

Referring now to FIGS. 14 through 18, details of the detents 12 carried by the closure C can be seen. As seen best in FIG. 14, three teeth or detents 12a, 12b and 12c are provided with tooth or detent 12a being the longest and tooth or detent 12c being the shortest. Tooth or detent 12a is the leading detent as the closure C is being threaded onto the container, and the lengths of the detents are selected such that a line drawn along the bottom three ends of the detents is parallel to a tangent to the helix angle of the thread on the container neck. Thus, with this construction, as the closure is threaded down onto the container, the longest detent 12a is that which will first encounter the detent 14 on release element 15, whereby if the clearances or tolerances have been maintained tight or low during manufacture of the closure and container, the leading or first detent 12a will have sufficient length to fully engage detent 14 when the closure has been threaded down onto the container a distance sufficient to align the detent 12a with detent 14. On the other hand, if the tolerances have been maintained in a middle range during manufacture of the closure and container, detent 12b which has a medium or middle length, will fully engage detent 14 with the closure threaded downwardly onto the container a distance slightly more than that necessary to engage detent 12a with detent 14, and yet the bottom end of detent 12b will not engage or interfere against the top surface of release element 15. Similarly, if tolerances have been maintained loose during manufacture of the closure 13 and container, then the trailing or third detent 12c will fully engage detent 14 with the closure threaded fully onto the container and without causing interference or engagement between the bottom end surface of detent 12c and the top surface of release element 15. The advantage of this construction is clear, since due to the pitch of the threads the axial positioning of the closure on the container will vary as the rotational position of the closure on the container varies. Therefore, depending upon the clearances or tolerances involved and the necessary amount of rotation of the closure to effect full seating thereof on the end of the container neck, the axial position of the bottom edge of the skirt of the closure relative to the release element will differ, and if all of the teeth were of the same length and the tolerances were loose, then additional rotational movement of the closure would be necessary to effect full seating thereof on the end of the container neck, with the result that the third detent would have to be engaged with the detent on the release element to prevent removal of the closure from the container, and the length of the release element would be such that it would engage or interfere with the release element, providing easy manipulation or full seating of the closure on the container. Alternatively, if the teeth were all of the same length and were made short enough to prevent this interference, and if the tolerances were tight or low, then the leading detent 12a would not fully engage the detent carried by the release element and excessive force applied to the closure may cause the detent 12a to overide and slip past the detent 14 in an opening movement of the closure.

The forward, inner corner of the detents 12a, 12b and 12c are tapered as at 19 for engagement with the radiused surface 17 of detent 14, whereby least resistance to movement of the detents past one another in a closure tightning direction is obtained. The rear end surfaces 20 of the detents 12a, 12b and 12c are flat for flush contacting engagement with the flat end surface 18 of detent 14 for maximum restraint to prevent movement of the detents past one another in a closure opening direction. Moreover, the detents 12a, 12b and 12c have substantially the same thickness t as the thickness of the cap or closure skirt and the detents are spaced apart from one another a circumferential distance at least as great as the circumferential extent of detent 14.

As seen in FIGS. 17 and 18, a circumferentially extending, reinforcing skirt 21 may be molded integrally with the closure and detents 12a, 12b and 12c if desired.

A modification of the preferred form of the invention is indicated generally at 11' in FIGS. 11, 12 and 13 and in this form of the invention the release element 15' is joined to the container neck at 15a', along a substantially circumferentially extending area rather than a longitudinally extending area as in the first described form of the invention. The upper end surface of release element 15' terminates substantially coplanar with the upper surface of tooth ring 16 and the detent 14 projects upwardly above this surface just as in the previously described form of the invention. Further, as in the previous form of the invention, the flat end surface 18 of detent 14 is disposed substantially parallel to a radius drawn to the container neck at the location of the surface 18, whereby maximum restraining force is obtained against opening movement of the closure. A flat surface is defined along line L2, just as in the previously described form of the invention, to provide clearance for the release element 15' when it is pressed inwardly to release the detent 12 and thus enable the closure C to be removed from the container.

In some respects, this second form of the invention is preferred over that first described, since it is somewhat easier to manufacture, and because the circumferentially extending connecting portion 15a' offers somewhat greater strength in resistance to opening movement of the closure. Otherwise, the same advantages and comments generally apply, particularly insofar as the substantially uniform thickness of the release element 15' and the connecting portion 15a' are concerned, whereby flexing of the release element occurs over a substantial portion thereof, to thereby prevent inducement of stress in concentrated areas of the release element. However, in this form of invention, it should be noted that the release element 15' tapers in thickness slightly from the left hand edge, as viewed in FIG. 11, to the right hand edge, for ease in removing the container from the mold during manufacture.

The same closure or cap is used with this form of the invention as is used with the previously described form of the invention.

A third form of the invention is indicated generally at 22 in FIGS. 19 through 30, and in this form of the invention the detent means or latching mechanism 11" is deflected or pressed downwardly or axially of the container in order to release the teeth or detents 12' on the cap or closure C', rather than inwardly or transversely of the axis of the container as in the previous forms of the invention.

More specifically, the latching element 11" includes a flexible release member or element 15" which constitutes a continuation of tooth ring 16 and has a substantially flat, generally rectangular configuration, joined along a hinge line HL to a connecting portion 15a" which integrally joins the release element 15" to the tooth ring 16. The release element 15" has a first thickness t1, slightly greater than the thickness t2 of the connecting portion 15", whereby the juncture between the two thicknesses defines the hinge line HL. Therefore, when the release element 15" is contacted and pressed downwardly, most of the flexing occurs at the hinge line HL and thus, the area of flexing of the release element is predetermined and can be selected to obtain maximum effectiveness in operation. Further, the inside radius ri is slightly less than half the distance from the flat surface defined by line L2 to the inner confronting surface of the free end of release element 15", for manufacturing purposes.

The detent 14' is integrally molded on the upper surface of the release element 15" at the inner edge thereof and has a planar abutment surface 18 coterminus or coplanar with the free end of release element 15", and a sloping upward surface or ramp 17' extending from the upper surface of the release element to the abutment surface 18. The beginning end of the ramp 17' is spaced circumferentially from the hinge line HL, such that when the teeth or detents 12 on the cap or closure C' engage the ramp, a leverage or mechanical advantage is obtained due to the distance of the point of contact from the hinge line, and operation or deflection of the release element is therefore easily accomplished and minimum friction is produced between the teeth or detents 12' and the detent 14' during closing movement of the cap or closure.

Moreover, the tooth ring 16 is interrupted at areas defined along lines L1 and L2 drawn perpendicular to radii R1 and R3, respectively, as in the previous forms of the invention, and these interrupted portions define flat areas or surfaces on the external surface of the container neck for clearance of the teeth or detents 12' carried by the cap or closure, and therefore enabling the release element 15" to be spaced radially as close to the neck as possible.

The closure or cap C' is constructed generally identically to that previously described, except that the teeth or detents 12a', 12b' and 12c' have leading sloping surfaces 19' for cooperation with the sloping surface 17' on detent 14' to facilitate movement of the detents past one another in a cap closing direction, rather than the tapered, radially inner surfaces 19 as in the previous form of the invention. The teeth 12a', 12b' and 12c' have flat, planar rear surfaces 20' for full, flush contacting engagement with the abutment surface 18 on detent 14' to prevent reverse or opening movement of the cap or closure C'. Further, the teeth or detents 12a', 12b' and 12c' have different lengths just as described in connection with the previous forms of the invention, whereby as the cap is turned to different rotational postitions and the axial position thereof accordingly changes relative to the container or bottle, the lower or free ends of the detents do not interfere or engage against the upper surface of the tooth ring or release element 15".

Additionally, and if desired, a reinforcing skirt 21' may be integrally molded on the bottom edge of the cap or closure C' to reinforce the teeth or detents 12a', 12b' and 12c' as in the previous forms of the invention.

Operation of all three forms of the invention is exceptionally simple and easy and the different types of latching or detent means may be applied to various closures where resistance to opening by children is desired.

Figure 31:
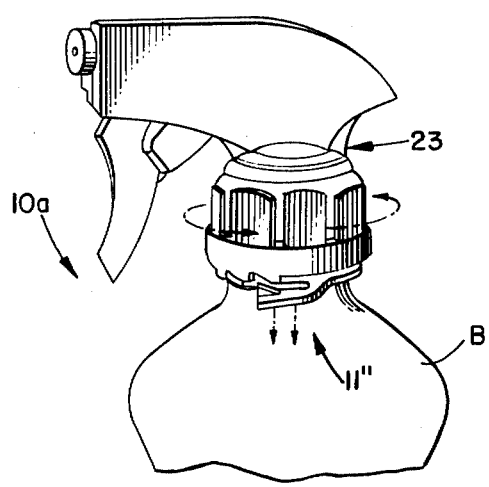
FIG. 31 is a fragmentary, perspective view of a modification of the invention wherein the retaining element and detent means of FIGS. 19 through 30 are used for securing a trigger operated dispensing mechanism to a container and showing the retaining element and detent depressed for removal of the closure and the trigger dispenser carried thereby.
Figure 32:
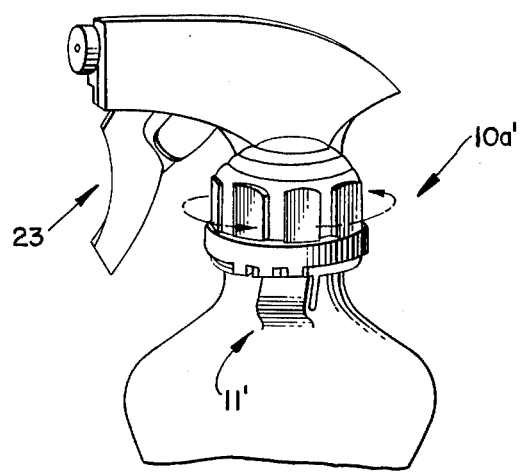
FIG. 32 is a view similar to FIG. 31 wherein the retaining element and detents of FIGS. 11 through 18 are used to secure the closure and trigger dispenser to the container.

For example, in FIG. 31, the push-down version 11" of the latching means is shown applied to a container 10a utilizing a trigger spray mechanism 23; and in FIG. 32, the push-in version 11' of the detent or release means is shown applied to a container 10a' with a trigger operated spray mechanism 23.

Figure 33:
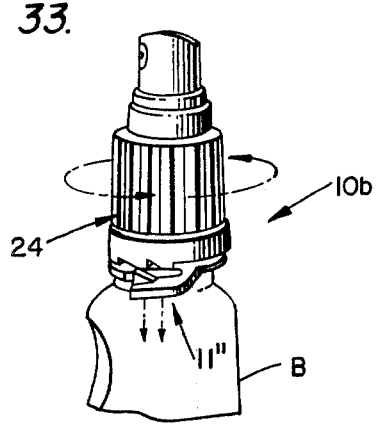
FIGS. 33 and 34 are views similar to FIGS. 31 and 32 showing the respective forms of the invention for securing a pump dispensing mechism to a container.
Figure 34:
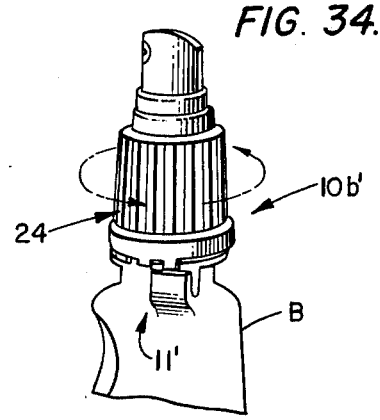

Further, in FIG. 33, the push-down version 11" of the release means is applied to a container 10b having a pump mechanism 24 applied thereto; and in FIG. 34, the push-in version 11' of the release means is used with the pump mechanism 24.

Figure 35:
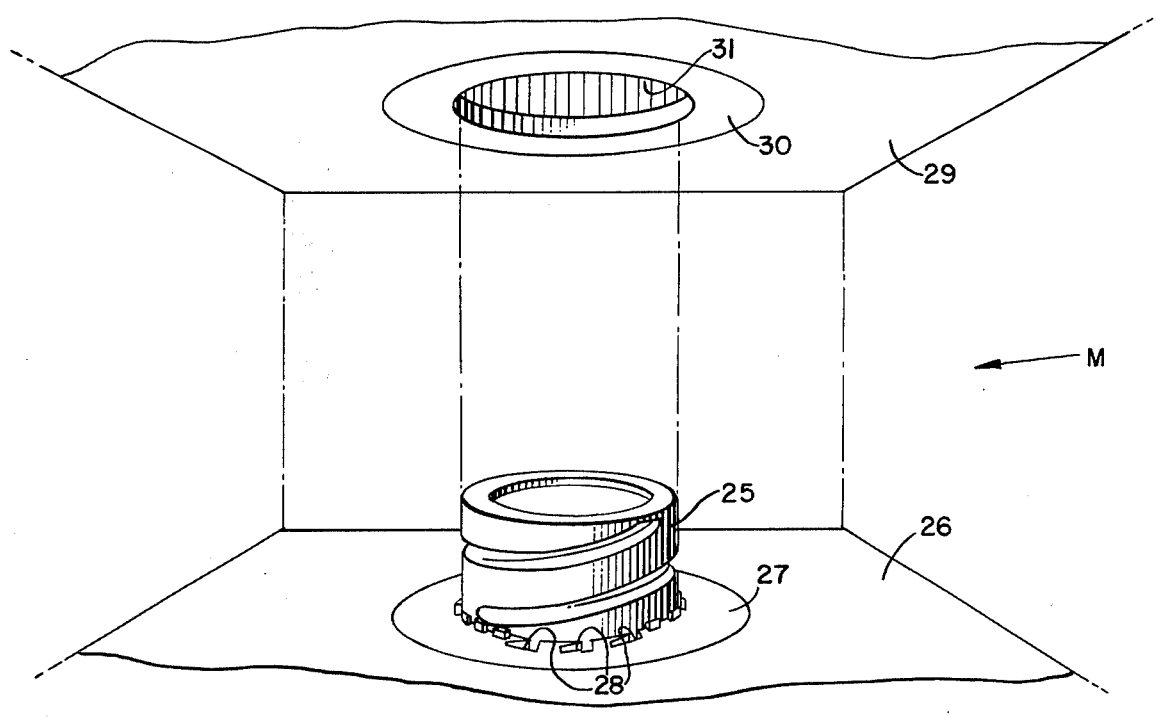
FIG. 35 is a diagramatic, perspective view of a portion of a mold apparatus for making a child-resistant closure according to the invention.

A portion of the mold apparatus for making the closure according to the invention is illustrated somewhat diagramatically in FIG. 35 and is indicated generally at M. The mold apparatus includes an upstanding generally cylindrically shaped main core 25 carried by an ejector plate 26 and having an ejector sleeve 27 disposed therearound. The only change required to the ejector sleeve 27 in order to produce the detent means on the cap or closure C of the invention is the formation of a plurality of cavities 28 in the ejector sleeve for forming the detents 12. Thus, it is very economical to convert existing mold equipment to manufacture the closure of the present invention, and in fact the mold equipment may be readily converted to make either the unique child-resistant closure of the invention, or standard closures not having the child-resistant features of the present invention.

A hot-half cavity plate 29 has a cavity 30 hollowed out at 31 for cooperation with the main core 25 to form the cap or closure C as seen in FIG. 36.

The injection blow mold equipment M' for making the container or bottle B is illustrated somewhat diagramatically in FIG. 37 and comprises substantially identical mold halves M'1 and M'2 in which suitably shaped cavities 32 and 33 are formed to shape the bottle or container when plastic is injected or blown into the mold formed by the assembled mold halves. Further in this connection, a mandrel 34 is provided, around the lower portion of which a body of plastic material is injected and the mold halves M'1 and M'2 are then assembled together around the mandrel 34 after which air pressure is introduced into the mandrel to blow the plastic therearound into the mold cavities 32 and 33 to form the shape as seen in full lines at B in FIG. 37.

The mold halves M'1 and M'2 carry neck rings 35 and 36 having suitable configurations 37 and 38 formed therein for making the threads or the like on the container neck.

A pin or projection 39 is affixed to one of the neck rings 35 for projection into a complementary cavity 40 in the other neck ring 36 to form the release mechanism 11, 11' or 11" of any of the forms of the invention described herein.

Thus, the only changes that are necessary to the mold equipment in order to make the container are to the neck ring itself, or more accurately, to the neck ring halves 35 and 36. Thus, changes to the mold equipment for producing the container of the present invention are very economical and easy to accomplish and the neck rings may be interchanged with unmodified neck rings in order to produce standard containers or bottles if desired.

Moreover, because of the simplicity of the present invention the container and closure may be made on injection blow mold equipment and the tolerances may be maintained at a precise level whereby a liquid seal is obtained without requiring liners and the like.

Additionally, it should be noted that while the release element has been shown and described as being on the container itself and the detents 12 being on the closure or cap, the parts may be reversed if desired with the release element being provided on the cap or closure and the detents on the container.

As this invention may be embodied in several forms without departing from the spirit or essential characteristics thereof, the present embodiment is, therefore, illustrative and not restrictive, since the scope of the invention is defined by the appended claims rather than by the description preceeding them, and all changes that fall within the metes and bounds of the claims or that form their functional as well as conjointly cooperative equivalents are, therefore, intended to be embraced by those claims.

We claim:

1. A child-resistant closure, comprising: a cap having an end wall and a depending skirt; said skirt having thread means thereon for cooperation with a threaded container to releasably secure the cap to the container; and a plurality of detents integrally formed on the cap skirt for cooperation with a complementary detent on a container with which the cap is associated, to latch the cap against movement in a cap loosening direction; said detents on the cap skirt being spaced circumferentially from one another and each having a different dimension in a direction axially of the skirt, with the leading detent having the greatest axial extent and the trailing detent having the least axial extent, wherein the leading and trailing detents are determined by a cap closing direction of rotation of the cap, whereby full and effective engagement is obtained between any of the detents on the cap with a cooperating detent on a container regardless of which detent on the cap is required to be aligned with a detent on a container for full sealing engagement of the cap with a container by different rotational and axial positions of the cap relative to the container.

2. A closure as in claim 1, wherein the axial extent of the detents on the cap is such that a line drawn along the farthest axially projecting points of the detents is parallel to a tangent to the helix angle of the cap threads.

3. A closure as in claim 2, wherein the detents project axially downwardly from the lower edge of the cap skirt.

4. A closure as in claim 3, wherein the detents have a radially inward surface, a leading end surface and a trailing end surface, said trailing end surface being substantially flat for restraining engagement against a complementary flat detent surface on a container with which the cap is associated, to prevent opening movement of the cap.

5. A closure as claim 4, wherein a tapered or beveled surface or shoulder is formed between the leading end surface and the radially inward surface of the detents for minimal frictional engagement with a detent on a container when the cap is threaded onto a container.

6. A closure as in claim 5, wherein a reinforcing skirt is molded integrally with the cap skirt and the detents thereon to reinforce the detents on the bottom edge of the skirt.

7. A closure as in claim 3, wherein the detents have a radially inward surface, a leading end surface, a trailing end surface and a bottom end surface, said trailing end surface being substantially flat for restraining engagement against a complementary flat detent on a container with which the cap is associated to prevent opening movement of the cap.

8. A closure as in claim 7, wherein a tapered or beveled surface or shoulder is formed between the leading end surface and the bottom end surface of the detents for minimal frictional engagement with a detent on a container when the cap is threaded onto a container.

9. A closure as in claim 8, wherein a reinforcing skirt is molded integrally on the bottom edge of the cap skirt at the detents thereon to reinforce the detents.

10. A container having a threaded neck for cooperation with a threaded closure cap, an annular tooth ring formed on the neck projecting radially outwardly therefrom, a child-resistant closure restraining means integrally formed on the container neck for cooperation with a cap to resist removal of the cap and comprising a continuation of the tooth ring, said closure restraining means comprising a flexible, spring-like member having a detent formed thereon for cooperation with a detent on a cap associated with the container to latch or restrain the cap against opening movement, said release member comprising a generally flat, rectangularly shaped body having length and width dimensions and a thickness dimension, and integrally molded on the container neck and having a free end and an end fixed to the container, said body having a substantially constant thickness throughout its length from the free end to the fixed end thereof, and being joined to the container along a radiused connecting portion, whereby the the body flexes generally uniformly over a substantial portion of its length in a direction generally perpendicular to the plane defined by the length and width dimensions when a detent on a cap engages the detent on the release member during closing movement of the cap onto the container and when the release member is manually and deliberately deflected to disengage the detent members to permit movement of the cap in an opening direction.

11. A container having a closure restraining means thereon as defined in claim 10, wherein the longitudinal axis of the release member body extends in a direction tangent to the container neck.

12. A container having a closure restraining means thereon as defined in claim 10, wherein the width dimension of the body extends generally parallel to the axis of the container and the body is joined along an area extending longitudinally of the container.

13. A container having a closure restraining means thereon as defined in claim 10, wherein the width dimension of the body extends in a direction parallel to a tangent of the container neck and the body is joined to the container along an area transverse to the longitudinal axis of the container.

14. A container having a closure restraining means thereon as defined in claim 12, wherein the detent has an outwardly facing radiused surface for cooperating engagement with a detent on a cap as the cap is threaded onto the container for minimal frictional engagement between the detents.

15. A container having a closure restraining means thereon as defined in claim 13, wherein the detent has an outwardly facing radiused surface for cooperating engagement with a detent on a cap when the cap is being threaded onto the container for minimal frictional engagement between the detents.

16. A container having a closure restraining means thereon as defined in claim 14, wherein the detent is formed on an upper side edge of the release member at the free end thereof.

17. A container having a closure restraining means thereon as defined in claim 15, wherein the detent is formed on the upper free end surface of the release member, said upper free end surface being substantially coplanar with the upper surface of the tooth ring.

18. A container having a closure restraining means thereon as defined in claim 11, wherein the length and width dimensions of the body lie in a plane substantially perpendicular to the longitudinal axis of the container and the body has an upper surface and a lower surface, said detent being formed on the upper surface at the free end of the release member.

19. A container having closure restraining means thereon as defined in claim 18, wherein an annular tooth ring is formed on the container neck extending radially outwardly therefrom, said release member comprising a continuation of the tooth ring and having its upper surface coplanar with the upper surface of the tooth ring.

20. A container having a closure restraining means thereon as defined in claim 19, wherein the release member is joined to the tooth ring by a radiused connecting portion, said body being joined to the connecting portion along a hinge line extending substantially perpendicularly to the longitudinal axis or length dimension of the body.

21. A container having a closure restraining means thereon as defined in claim 20, wherein the hinge line is defined by the juncture between two different thicknesses of the body, said body having a first thickness extending from the free end thereof to the hinge line and a second thickness extending from the hinge line through the connecting portion to the tooth ring, said first thickness being greater than the second thickness.

22. A container having a closure restraining means thereon as defined in claim 21, wherein the detent on the release member has a tapered or sloping upper surface extending from the free end rearwardly toward the hinge line and terminating at the upper surface of the body short of the hinge line.

23. A container having a closure restraining means thereon as defined in claim 22, wherein the tooth ring is interrupted over an area extending from adjacent the release member to a point spaced circumferentially from the release member to provide clearance for detents on a cap threaded onto the container beyond the detent on the release member.

24. In combination, a container and closure cap wherein the container has a threaded neck with a tooth ring thereon and the cap has a threaded skirt cooperatively engaged with the threaded neck releasably securing the cap to the container, the improvement comprising interengaging child-resistant detent means on the container neck and cap resisting opening movement of the cap, said detent means including at least one detent member integrally molded on the cap skirt, and a cooperating detent on the container neck, said detent on the container being carried by a flexible release member having a generally flat, rectangularly shaped body having length and width dimensions and a thickness dimension and having a free end and an end fixed to the container at the neck of the container and comprising a continuation of the neck ring, said body being joined to the container neck along a radiused connecting portion, said body flexing generally uniformly over a substantial portion of its length when the detent on the cap engages the release member during closing movement of the cap onto the container and when the release member is deflected to disengage the detent members to permit movement of the cap in an opening direction.

25. The combination as in claim 24, wherein a plurality of detents are formed on the cap skirt for cooperative engagement with the detent on the release member, said plurality of detents including at least a leading detent, a trailing detent and a middle detent, whereby at least one of the detents will securely engage the detent on the release member when the cap is threaded tightly onto the container.

26. The combination as in in claim 25, wherein the detents on the cap have different lengths axially of the cap, the lengths being such that a line drawn along the farthest axial points of the free ends thereof extends parallel to a tangent to the helix angle of the threads of the cap.

27. In combination, a container and closure cap wherein the container has a threaded neck and the cap has a threaded skirt cooperatively engaged therewith releasably securing the cap to the container, the improvement comprising interengaging child-resistant detent means on the container and cap resisting opening movement of the cap, said detent means including a plurality of detent members integrally molded on the cap skirt, including at least a leading detent, a trailing detent and a middle detent, the detents on the cap having different lengths axially of the cap, the lengths being such that a line drawn along the farthest axial points of the free ends thereof extends parallel to a tangent to the helix angle of the threads of the cap, and a cooperating detent on the container, whereby at least one of the detents will securely engage the detent on the release member when the cap is threaded tightly onto the container, said detent on the container being carried by a flexible release member having a generally flat, rectangularly shaped body having length and width dimensions and a thickness dimension and having a free end and an end fixed to the container, said body being joined to the container along a radiused connecting portion, whereby the body flexes over a substantial portion of its length when the detent on the cap engages the release member during closing movement of the cap onto the container and when the release member is deflected to disengage the detent members to permit movement of the cap in an opening direction.

* * * * *